United States Patent
Sternowski

(10) Patent No.: US 9,244,148 B1
(45) Date of Patent: Jan. 26, 2016

(54) GEOLOCATION OF RADIO FREQUENCY SIGNALS WITHIN A SENSITIVE AREA USING A GRID OF LINEAR ANTENNAS

(71) Applicant: Softronics, Ltd., Marion, IA (US)

(72) Inventor: Robert Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 473 days.

(21) Appl. No.: 13/898,906

(22) Filed: May 21, 2013

Related U.S. Application Data

(60) Provisional application No. 61/710,840, filed on Oct. 8, 2012.

(51) Int. Cl.
  *G01S 3/02* (2006.01)
  *G01S 5/02* (2010.01)

(52) U.S. Cl.
  CPC ........................................ *G01S 5/02* (2013.01)

(58) Field of Classification Search
  CPC .......... G01S 3/02; G01S 15/88; H04W 64/00; G08B 13/2497; H01Q 1/007
  USPC ........................................................ 342/465
  See application file for complete search history.

(56) References Cited

U.S. PATENT DOCUMENTS

| | | | |
|---|---|---|---|
| 5,329,576 A * | 7/1994 | Handforth | H04W 64/00 379/55.1 |
| 5,586,167 A | 12/1996 | Handforth | |
| 6,252,507 B1 * | 6/2001 | Gagnon | G08B 13/2497 340/539.1 |
| 7,522,045 B2 | 4/2009 | Cutler et al. | |
| 8,798,529 B2 * | 8/2014 | Timmins | H01Q 1/007 455/14 |
| 9,030,914 B2 * | 5/2015 | Guigne | G01S 15/88 367/87 |
| 2006/0166681 A1 * | 7/2006 | Lohbihler | G01S 5/02 455/456.2 |

* cited by examiner

*Primary Examiner* — Harry Liu
(74) *Attorney, Agent, or Firm* — Jason R. Sytsma; Shuttleworth & Ingersoll, PLC

(57) ABSTRACT

A system detects the location of an uncooperative emitter by measuring the power level in an RF signal using a grid of linear antennas. The linear antennas are arranged in an x,y axis with intersections strategically placed in areas of interest. A detector detects the power level in each of the leaky signal cables. A processor in communication with the detector identifies the cable intersection having the greatest power level and associates that intersection as the location of the uncooperative emitter.

32 Claims, 6 Drawing Sheets

GEOLOCATION OF RADIO FREQUENCY SIGNALS WITHIN A SENSITIVE AREA USING A GRID OF LINEAR ANTENNAS

This non-provisional patent application claims priority to U.S. Provisional Patent Application No. 61/710,840 filed on Oct. 8, 2012 the entirety of which is hereby incorporated by reference herein.

The present invention relates to a system for determining the position of a device that emits a detectable signal.

BACKGROUND

The need to determine the position of an unauthorized and uncooperative emitter within structures or areas can arise due to many different reasons and under highly variable physical conditions. Geolocating radio frequency (RF) signals within structures or areas, including buildings, ships, caverns, malls, parks, etc., is a difficult problem due to radio propagation issues. More specifically, RF signals are often blocked, attenuated, or reflected by the structure's or area's materials. This hinders the usefulness of traditional geolocation and direction finding techniques. To resolve this problem, the prior art is replete with examples of hand-held or portable RF detectors that are used to zero-in on the RF signal. Unfortunately, when seeking an RF emitter under these circumstances, it is often hostile or uncooperative, and may cease operating when a search begins. What is needed is a passive system that continuously monitors a sensitive area for unauthorized RF emitters.

SUMMARY

A system is provided that detects the location of an uncooperative emitter by measuring the power level in an RF signal using a grid or a plurality of strings of series connected linear antennas. In an embodiment, the linear antennas are leaky signal cables arranged in an x, y axis with intersections strategically placed in areas of interest. A detector detects the power level in each of the leaky signal cables. A processor in communication with the detector identifies the cable intersection having the greatest power level and associates that intersection as the location of the uncooperative emitter.

In another embodiment, a plurality of strings of series connected antennas arranged in a binary pattern covering areas of interest. A detector detects the presence and absence of a signal in each string and deduces a binary number corresponding to an area of interest where the emitter can be found.

DETAILED DESCRIPTION

Figure 1:
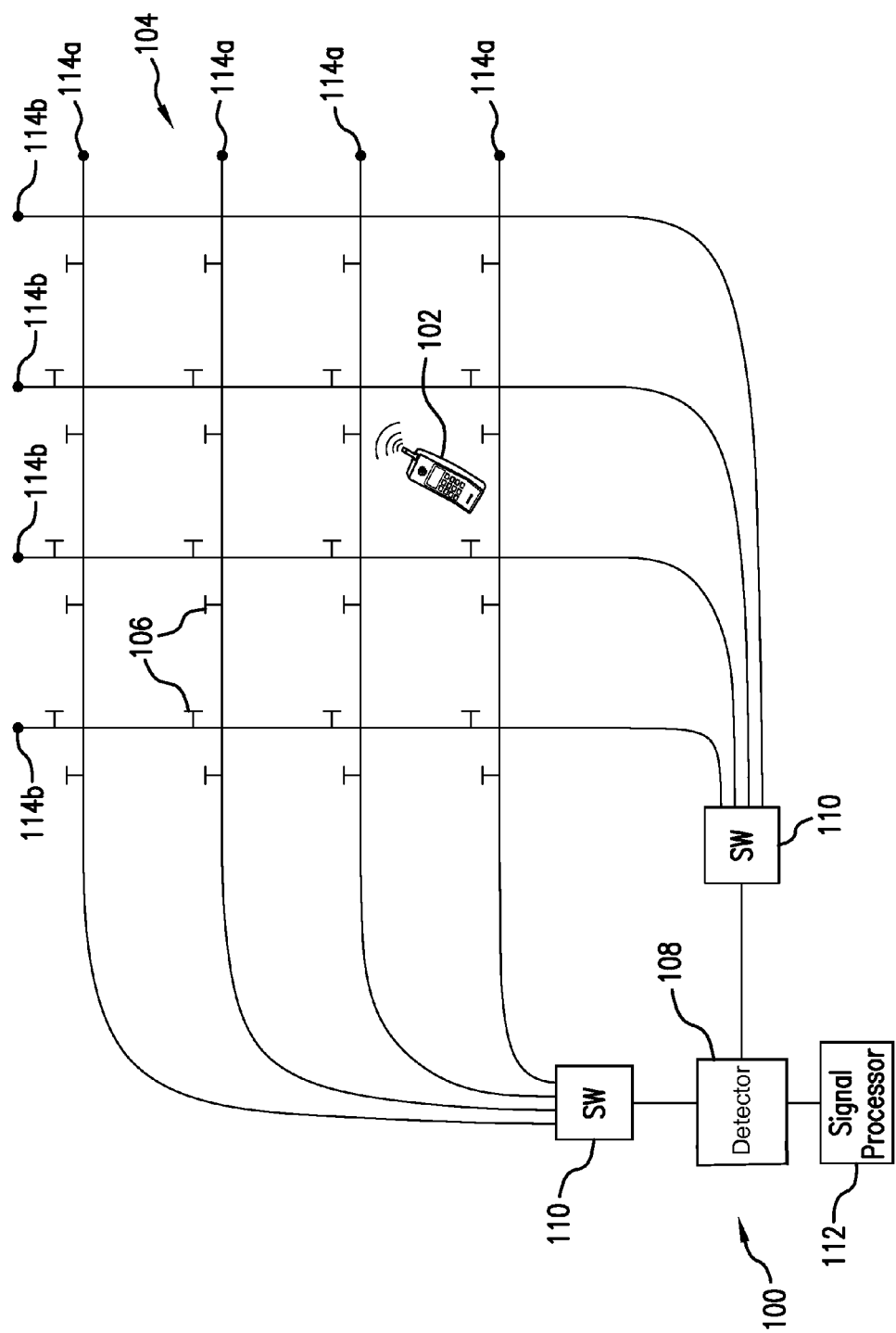
FIG. 1 shows a diagram of a system using an antenna grid to locate an emitter.

FIG. 1 discloses a system 100 for determining a location of a signal produced by an emitter 102. System 100 passively surveys a sensitive area or building for an unauthorized or uncooperative emitter 102 using a grid 104 of strategically positioned linear antennas 106 and one or more radio frequency (RF) detectors 108.

Linear antenna 106 is a type of antenna that produces an essentially constant power output anywhere along its length at a constant reference distance in response to an RF signal from emitter 102 that has a constant power. The following are examples of such a linear antenna 106: a coaxial cable with carefully located slots in the outer shield acting as a long slot antenna, which is also known as a "leaky feeder"; a long slotted waveguide for microwave signals; a multiplicity of discrete antennas connected in phase and in series, horizontally or vertically, to provide a linear radiation pattern; and other antenna forms meeting the general requirements. The RF signals from emitter 102 are detected in antenna 106 with RF detector 108.

The energy from the RF signal induced in antenna 106 is inversely related to the square of the distance between emitter 102 and antenna 106 in free space. In free space, all electromagnetic waves (radio, light, X-rays, etc.) obey the inverse-square law which states that the power density of an electromagnetic wave is proportional to the inverse of the square of the distance from a point source. Doubling the distance from emitter 102 means that the power density of the radiated wave at that new location is reduced to one-quarter of its previous value.

Figure 4:
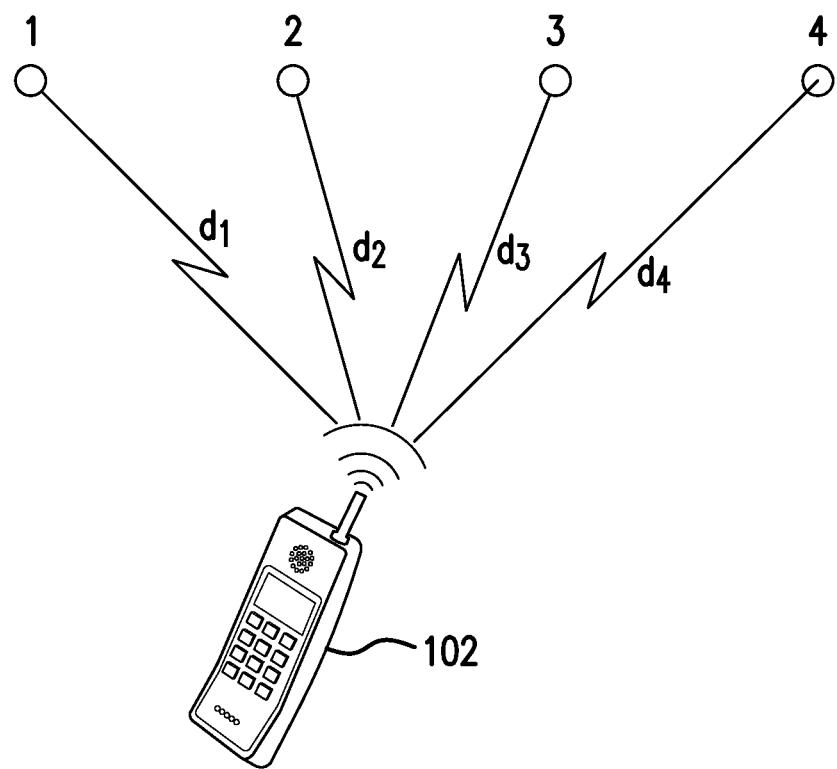
FIG. 4 illustrates how the strength of an RF signal decreases as it RF signal travels away from the emitter.

FIG. 4 shows various distances "d" between locations 1, 2, 3, 4 for antenna 106 and emitter 102. In this example $d4>d1>d3>d2$. This means that the energy "E" induced in antenna 106 at locations 1, 2, 3, 4 is related in the following manner $Ed4<Ed1<Ed3<Ed2$. In grid 104 of series connected antennas 106 arranged in x-rows 114a and y-columns 114b6, the energy induced in each row 114a and column 114b of series connected antennas 106 will relate to the distance that the respective antennas 106 in rows 114a and columns 114b are from emitter 102. Row 114a and column 114b with antenna 106 closest to emitter 102 will have the largest induced power. Therefore, the intersection of row 114a and column 114b with the strongest RF power measurement is the location of emitter 102. This location is accurate to within one-half of the spacing for each axis in grid 104.

RF detector 108 measures the power on a desired frequency in each row 114a and column 114b of antennas 106 in grid 104 in rapid sequence. A single RF detector 108 can scan across all rows 114a and columns 114b of antennas 106 with a switching device 110 or a separate RF detector 108 can be connected to each row 114a and column 114b of antennas 106. In both instances, the resulting measurements are compared in near-zero time to locate very short transmissions or bursts. A processor 112 connected to RF detector 108 associates the received RF signal levels with the appropriate (x,y) or (x,y,z) coordinates and provides the information to an operator. One skilled in the art would recognize that RF detector 108 can include an RF power measurement device, a spectrum analyzer, an RF receiver, etc.

Figure 2:
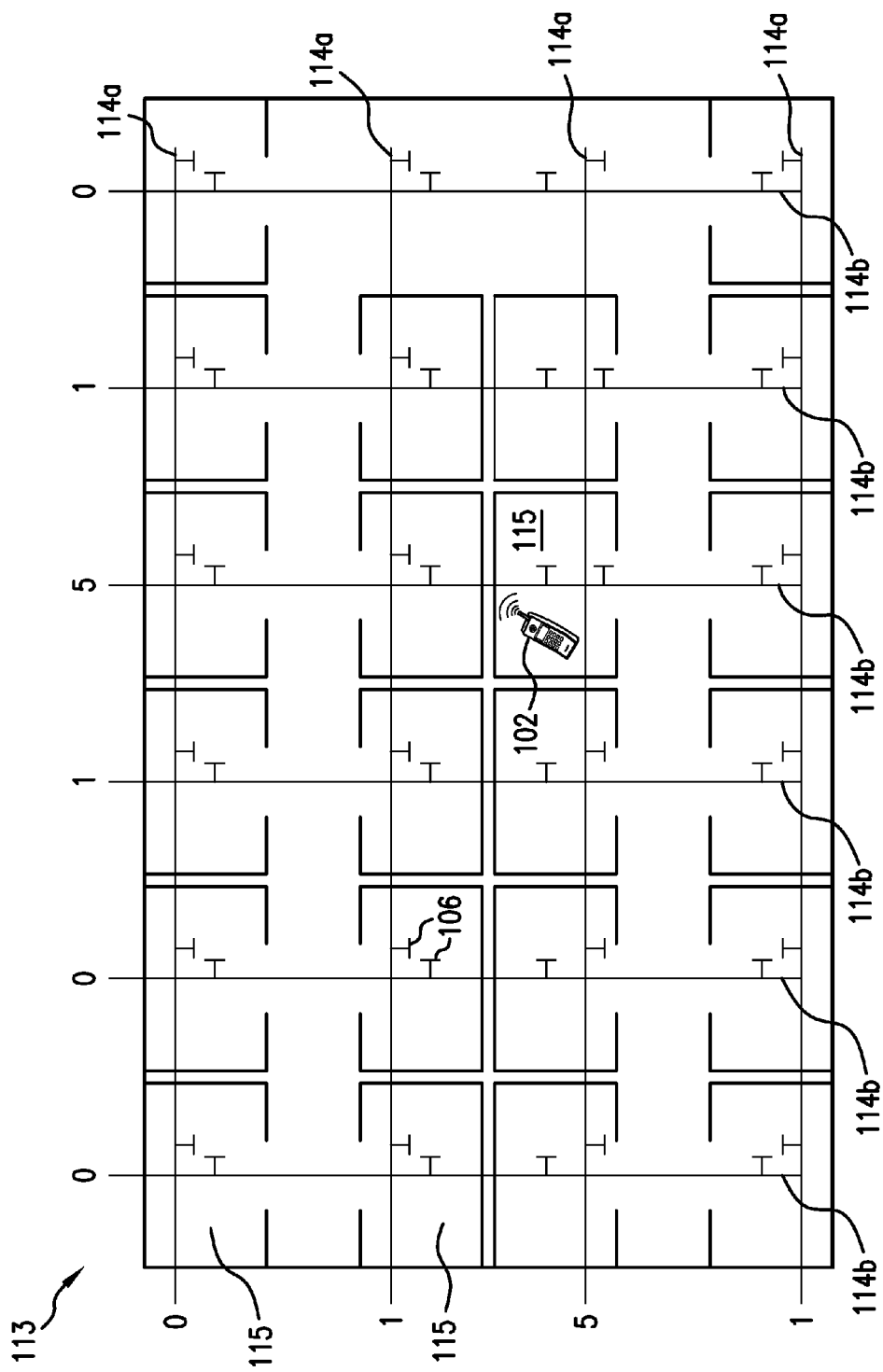
FIG. 2 shows a diagram of a system using an antenna grid overlaid on a building floor plan.

FIG. 2 shows a horizontal grid comprising (x,y) rows and columns 114a, 114b of linear antennas 106 overlaid in a floor of a building 113 with a plurality of offices 115, where each office 115 is an area of interest. The energy from emitter 102 is detected by antennas 106 along the length of cable making up row 114a and column 114b. As previously stated, the energy induced in each row-x 114a and column-y 114b of series connected antennas 106 will relate to the distance that the respective antennas 106 in rows 114a and columns 114b are from emitter 102. The row 114a and column 114b with an antenna 106 closest to emitter 102 will have the largest induced power. The measured power in each row 114a and column 114b is indicated in FIG. 2. The row 114a and column 114b measuring "5" indicates the x,y coordinate associated with room 115 is the location of the uncooperative emitter 102.

Antennas 106 may be laid across each other on the top of a suspended ceiling with radio transparent panels. Grid 104 can be evenly spaced or arranged so that the expected locations or areas of concern are at intersections of antenna 106. Each row 114a and column 114b of antennas 106 do not necessarily have to be laid in parallel so that each row 114a and column 114b are orthogonal. Grid 104 spacing can be set according to the physical location and with the desired accuracy. The physical location and accuracy are only limited by the smallest measurable power increment at the desired frequency, for example, if the parallel antennas 106, i.e. antennas in parallel rows 114a or columns 114b, are too close together the difference in power between antennas 106 may not be accurately measured.

Figure 3:
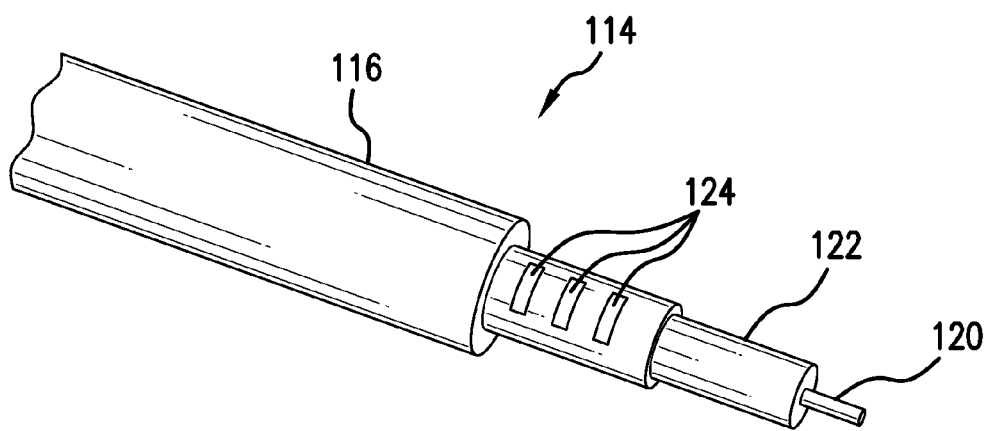
FIG. 3 shows a leaky co-axial cable used in the system of FIG. 1.

In the illustrated embodiment, grid 104 is comprised of leaky cables. FIG. 3 shows a leaky cable in the form of a co-axial cable 114. Co-axial cable 114 has an outer jacket 116 surrounding a shielding layer 118. An inner conductor 120 that carries an electrical signal is separated from shielding layer 118 by dielectric layer 122. To form antennas 106, an aperture 124 is formed in the shielding layer 118 so that RF signals in the environment can be received by inner conductor 120. Apertures 124 function as antennas 106 because the gap in shielding layer 118 allow RF signals into cable 114. Apertures 124 are strategically placed in cable 114 to correspond with areas of interest.

Figure 5:
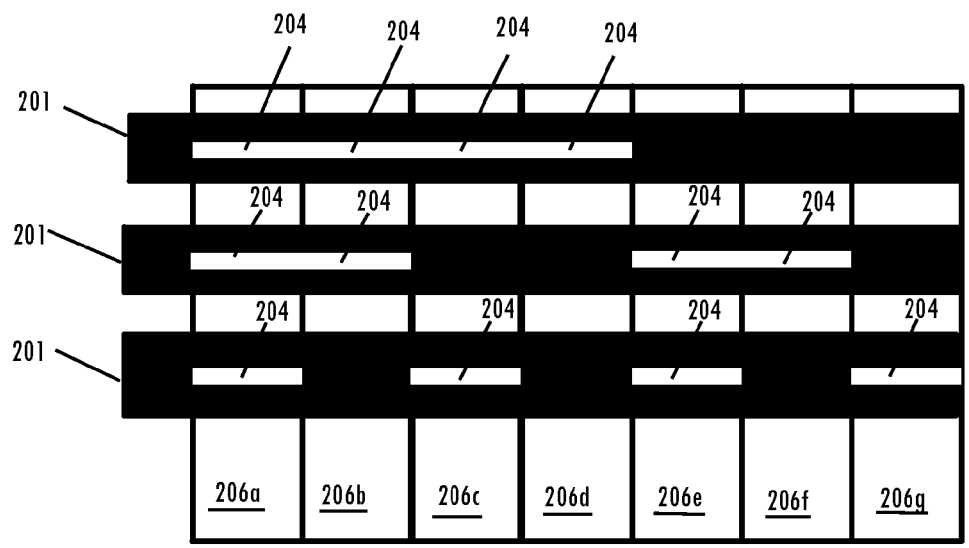
FIG. 5 shows three leaky feeders arranged in a binary pattern and covering seven areas of interest.

In an alternative embodiment, an uncooperative emitter can be located with a binary arrangement of linear antennas. FIG. 5 shows three leaky feeders 202a-202c with strategically placed apertures 204 over selected areas of interest 206a-206g. Leaky feeders 202 have a binary pattern of apertures 204, where apertures 204 correspond to a logical "1," and no apertures corresponds to a logical "0." Assuming that each area of interest 206a-206g heavily attenuates any electromagnetic signal that emanates therefrom, the location of the emitter can be determined by monitoring binary output on leaky feeders 202a-202c. Three leaky feeders 202a-202c can uniquely identify seven areas of interest by the formula $7=2^3-1$. Table 1, below, shows the binary number for each area of interest 206a-206g from leaky feeders 202a-202c.

TABLE 1

| | | | | | | | |
|---|---|---|---|---|---|---|---|
| Leaky Feeder 202a | 1 | 1 | 1 | 1 | 0 | 0 | 0 |
| Leaky Feeder 202b | 1 | 1 | 0 | 0 | 1 | 1 | 0 |
| Leaky Feeder 202c | 1 | 1 | 1 | 0 | 1 | 0 | 1 |
| Emitter is in Area #: | 206a | 206b | 206c | 206d | 206e | 206f | 206g |

As illustrated in Table 1, above, each area of interest 206a-206g is uniquely identified with a binary number, for example, area of interest 206a equals "111" and area of interest 206d equals "100." If an emitter broadcasts from area of interest 206d, an appropriate RF detector 108 and signal processor 112 (as described in connection with FIG. 1) is programmed to recognize the output of "100" corresponds to area of interest 206d where the uncooperative emitter can be found.

Figure 6:
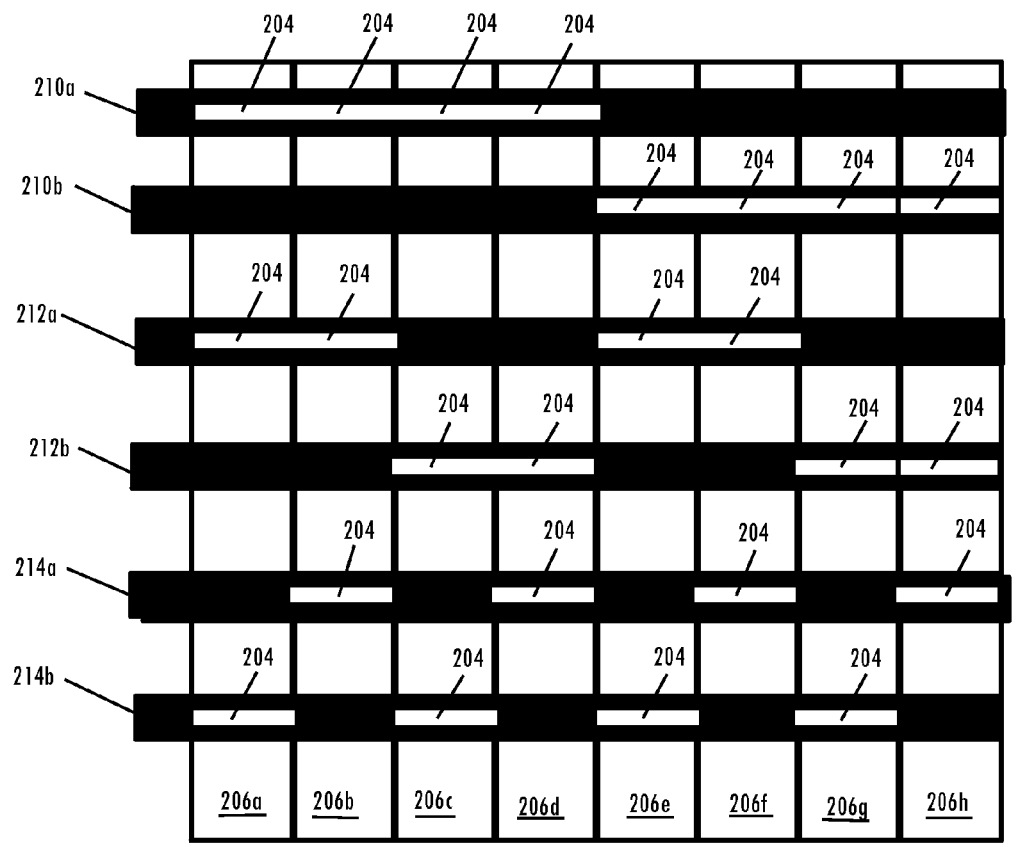
FIG. 6 shows three leaky feeder pairs arranged in a binary pattern and covering seven areas of interest.

FIG. 6 shows yet another embodiment of a double leaky feeder system. Leaky feeders 210a, b, 212a, b, and 214a, b are arranged in complementary pairs of alternating logical 1s and 0s, where logical 1 corresponds with an aperture 204. Table 2, below, shows the binary number for each area of interest 206a-206h from leaky feeders 210a,b-214a,b.

TABLE 2

| | | | | | | | | |
|---|---|---|---|---|---|---|---|---|
| Leaky Feeder 210a | 1 | 1 | 1 | 1 | 0 | 0 | 0 | 0 |
| Leaky Feeder 210b | 0 | 0 | 0 | 0 | 1 | 1 | 1 | 1 |
| Leaky Feeder 212a | 1 | 1 | 0 | 0 | 1 | 1 | 0 | 0 |
| Leaky Feeder 212b | 0 | 0 | 1 | 1 | 0 | 0 | 1 | 1 |
| Leaky Feeder 214a | 0 | 1 | 0 | 1 | 0 | 1 | 0 | 1 |
| Leaky Feeder 214b | 1 | 0 | 1 | 0 | 1 | 0 | 1 | 0 |
| Emitter is in Area #: | 206a | 206b | 206c | 206d | 206e | 206f | 206g | 206h |

As illustrated in Table 2, above, each area of interest 206a-206h is uniquely identified with a 6-digit binary number, which allows two simultaneous uncooperative emitters to be unambiguously located.

The passive grid or strings of antennas described herein can detect and identify multiple unauthorized emitters that are transmitting simultaneously. Furthermore, the RF detection system is frequency independent meaning that the RF detector can be set to monitor a single frequency of interest or configured as a broadband scanner that scans many frequencies and channels at once.

Reference has been made to several components throughout this disclosure as though each component is a unique component. One skilled in the art will readily recognize, however, that the various systems, receivers, antennas, and processors can be incorporated into one or more other systems, receivers, and processors thereby reducing the number of components, for example, a receiver and processor can be combined as a single receiver or bundled separately.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A system for determining a location of a signal produced by an emitter, the system comprising:
    a receiver having a plurality of first input channels and a plurality of second input channels;
    an antenna grid including a first plurality of series connected antennas connected to a corresponding one of the plurality of first input channels and a second plurality of series connected antennas connected a corresponding one of the plurality of second input channels, wherein the first plurality of series connected antennas intersects the second plurality of series connected antennas at locations of interest to form the grid; and
    wherein the receiver determines a signal strength at each of the plurality of first input channels and each of the plurality of second input channels and determines the location of the emitter from the series connected antenna among the first plurality of series connected antennas and the series connected antenna among the second plurality of series connected antennas with the greatest measured power levels.

2. The system of claim 1, wherein the first plurality of series connected antennas and the second plurality of series connected antennas are leaky signal cables.

3. The system of claim 2, wherein leaky signal cables are coaxial cables.

4. The system of claim 1, wherein the location where the first plurality of series connected antennas intersects the second plurality of series connected antennas is an area of interest.

5. The system of claim 1, wherein the first plurality of series connected antennas and the second plurality of series connected antennas are discrete antennas.

6. The system of claim 1, wherein the first plurality of series connected antennas and the second plurality of series connected antennas are substantially on a same x,y plane.

7. The system of claim 6, wherein the receiver further comprises a plurality of third input channels, and wherein the grid further comprises a third plurality of series connected antennas connected to each of the plurality of third input channels on the receiver.

8. The system of claim 7, wherein the third plurality of series connected antennas are on a z plane.

9. A method for determining a location of an emitter producing a signal, the method comprising:
    receiving the signal through an intersecting grid of series connected antennas;
    measuring with a detector a power level of the signal in each row and column of the grid of series connected antennas; and
    associating with a processor the location of the emitter with the row of series connected antennas and the column of series connected antennas that has the greatest measured power level.

10. The method of claim 9, wherein the grid of series connected antennas further comprises a plurality of leaky cables arranged in rows and a plurality of leaky cables arranged in columns that intersect the plurality of leaky cables arranged in rows.

11. The method of claim 9, and further comprising switching between each row of series connected antennas to measure the power level in each row of series connected antennas.

12. The method of claim 11, and further comprising switching between each column of series connected antennas to measure the power level in each column of series connected antennas.

13. The method of claim 12, wherein the row of series connected antennas and the column of series connected antennas are substantially on the same plane, and further comprising a third dimension of series connected antennas defining a three-dimensional grid.

14. A system for detecting the location of a signal produced by an emitter, the system comprising:
    a plurality of leaky signal cables arranged along an x-axis;
    a plurality of leaky signal cables arranged along a y-axis, wherein the plurality of leaky signal cables arranged along the x-axis and the plurality of leaky signal cables arranged along the y-axis define a plurality of cable intersections;
    at least one detector in communication with each of the plurality of leaky signal cables arranged along the x-axis and the plurality of leaky signal cables arranged along the y-axis to determine a power level in each in order to identify the cable intersection among the plurality of cable intersections having a greatest power level.

15. The system of claim 14, and further comprising a plurality of leaky cables arranges along a z-axis.

16. The system of claim 15, wherein leaky signal cables are coaxial cables.

17. The system of claim 14, and further comprising a first switch configured to receive the plurality of leaky signal cables arranged along the x-axis and a second switch configured to receive the plurality of leaky signal cables arranged along the y-axis, wherein the first switch and the second switch cooperate to provide one at a time communication to the detector a corresponding one of the leaky signal cables in the x-axis and the y-axis.

18. The system of claim 17, and further comprising a plurality of leaky cables arranges along a z-axis, and a third switch configured to receive the plurality of leaky signal cables arranged along the z-axis, wherein the first switch, the second switch, and the third switch cooperate to provide one at a time communication to the detector a corresponding one of the leaky signal cables in the x-axis, the y-axis, and the z-axis.

19. The system of claim 18, wherein the signal is an RF signal.

20. The system of claim 19, wherein the plurality of leaky signal cables arranged along the x-axis are not parallel with respect to each other and the plurality of leaky signal cables arranged along the y-axis are not parallel with respect to each other.

21. A system for determining a location of a signal produced by an emitter, the system comprising:
    a plurality of strings of series connected antennas;
    at least one receiver, wherein each of the plurality of strings of series connected antennas are in communication which the at least one receiver, wherein the receiver determines a presence of the signal in the plurality of strings of series connected antennas due to receipt of the signal by at least one of the antennas in the string of series connected antennas and deduces a binary number that corresponds to the location of the emitter.

22. The system of claim 21, wherein the string of series connected antennas is a leaky feeder coaxial cable.

23. The system of claim 22, wherein the leaky feeder coaxial cable has an aperture that functions as an antenna, and the plurality of leaky feeder coaxial cables are arranged in a group with a pattern of apertures, wherein an aperture corresponds to a logical, 1, and the pattern of apertures uniquely identify each area of interest.

24. The system of claim 23, wherein the receiver detects the presence and absence of the signal on the plurality of leaky feeders to deduce the binary number that corresponds to the location of the emitter.

25. A system for determining a location of a signal produced by an emitter, the system comprising:
    a first plurality of receivers each having an input channel;
    a first plurality of series connected antennas each being connected to one of the first plurality of receivers;
    a second plurality of receivers each having an input channel;
    a second plurality of series connected antennas each being connected to one of the second plurality of receivers, wherein the first plurality of series connected antennas and the second plurality of series connected antennas cooperate to form a grid; and
    wherein the first plurality of receivers and the second plurality of receivers cooperate to determine a signal strength at each of the input channels of the first receivers and the second receivers for determining the location of the signal therefrom.

26. The system of claim 25, wherein the first plurality of series connected antennas and the second plurality of series connected antennas are leaky signal cables.

27. The system of claim 25, wherein one of the first plurality of series connected antennas intersects one of the second plurality of series connected antennas at an area of interest.

28. The system of claim 25, wherein the first plurality of series connected antennas and the second plurality of series connected antennas are substantially on a same x,y plane.

29. A system for determining a location of a signal produced by an emitter, the system comprising:
a plurality of strings of series connected antennas;
a plurality of receivers, wherein each one of the plurality of strings of series connected antennas are in communication with one of the plurality of receivers, wherein the receivers cooperate to determine a presence of the signal in the plurality of strings from receipt of the signal by at least one of the antennas in the string of series connected antennas and deduce a binary number that corresponds to the location of the emitter.

30. The system of claim 29, wherein the string of series connected antennas is a leaky feeder coaxial cable.

31. The system of claim 30, wherein the leaky feeder coaxial cable has an aperture that functions as an antenna, and the plurality of leaky feeder coaxial cables are arranged in a group with a pattern of apertures, wherein an aperture corresponds to a logical, 1, and the pattern of apertures uniquely identify each area of interest.

32. The system of claim 31, wherein the receivers cooperate to detect the presence and absence of the signal on the plurality of leaky feeders to deduce the binary number that corresponds to the location of the emitter.

* * * * *